United States Patent
Frame

[19]
[11] Patent Number: 6,005,368
[45] Date of Patent: Dec. 21, 1999

[54] CHARGING SYSTEM FOR COMPUTER WITH DOCKING STATION

[75] Inventor: Robert C. Frame, Westboro, Mass.

[73] Assignee: Digital Equipment Corporation, Maynard, Mass.

[21] Appl. No.: 09/107,647

[22] Filed: Jun. 30, 1998

[51] Int. Cl.⁶ .............. H02J 7/00; H01R 3/00; H01R 19/00

[52] U.S. Cl. .......... 320/113; 320/162; 361/683; 439/800; 439/627; 395/281; 307/53

[58] Field of Search .......... 320/162, 160, 320/137, 124, 125, 126, 113; 361/683, 686, 727; 439/500, 627; 395/281; 307/53, 64

[56] References Cited

U.S. PATENT DOCUMENTS

| | | | |
|---|---|---|---|
| 4,885,521 | 12/1989 | Crampton | 320/126 |
| 5,721,481 | 2/1998 | Narita et al. | 320/111 |
| 5,734,254 | 3/1998 | Stephens | 320/106 |
| 5,875,312 | 2/1999 | Walsh et al. | 395/309 |
| 5,886,424 | 3/1999 | Kim | 307/64 |
| 5,889,964 | 3/1999 | Cho et al. | 710/101 |

*Primary Examiner*—Peter S. Wong
*Assistant Examiner*—Gregory J. Toatley, Jr.
*Attorney, Agent, or Firm*—Robert Groover

[57] ABSTRACT

A portable computer and docking station combination, comprising first and second batteries and first and second battery charging circuit portions, with automatic sequencing of charging between the batteries. The system includes means for charging a first battery based on an amount of current flowing into the computer circuitry, and means for charging a second battery based on an amount of current flowing into the first battery and into the computer circuitry.

23 Claims, 4 Drawing Sheets

CHARGING SYSTEM FOR COMPUTER WITH DOCKING STATION

FIELD OF THE INVENTION

This invention relates generally to methods and apparatus for charging batteries, and more particularly to methods and apparatus for charging multiple batteries in a portable computer with a docking station.

BACKGROUND OF THE INVENTION

Portable computers have afforded their users great flexibility by allowing them to be used away from a power source. Such computers generally include a rechargeable battery and a detachable charger. Many manufacturers provide for an extra battery that can be substituted for the computer's battery to permit enhanced autonomy. It is known to charge this separate battery with a charger while the charger is not being used to charge the battery in the computer, and then to swap the batteries.

SUMMARY OF THE INVENTION

In one general aspect, the invention features a portable computer including a portable computer unit, comprising computing circuitry having a power node, a first battery having a terminal, a first docking connector portion including computing circuitry interface contacts operatively connected to the computing circuitry, a second docking connector portion including power supply contacts including at least one contact operatively connected to the power node of the computing circuitry and at least one contact operatively connected to the terminal of the first battery. The portable computer also includes a docking station comprising a second battery having a terminal, a third docking connector portion including computing circuitry interface contacts constructed and adapted to mate with the interface contacts of the first docking connector portion, and a fourth docking connector portion including power supply interface contacts constructed and adapted to mate with the power supply contacts of the second docking connector portion. The portable computer also includes a charging circuit having a first output operatively connected to the first battery terminal, a second output operatively connected to the second battery terminal, and a third output operatively connected to the power node of the portable computer unit, and a power supply input connector constructed and adapted to mate with a connector of a power supply.

The first docking connector portion can be constructed and adapted to mate with the connector of the power supply, and a portion of the charging circuit can be located within the portable computer unit and can be responsive to the power supply. The portable computer can further include an input connector portion constructed and adapted to mate with the connector of the power supply, and a portion of the charging circuit can be located within the portable computer unit and be responsive to the power supply. The charging circuit includes a first battery charging portion operatively connected between the first output of the charging circuit, the third output of the charging circuit and a second battery charging portion that also has a first input operatively connected to the power supply node and a first output operatively connected to the second battery terminal. The first charging portion can include a first sense resistor operatively connected between the third output of the charging circuit and a second node and further including a first battery charger having a pair of sense terminals operatively connected the first sense resistor, and at least one charging terminal operatively connected to the first battery terminal, and the second charging portion can include a second sense resistor operatively connected between the second node and the input of the charging circuit. The portable computer can further include a second battery charger having a pair of sense terminals operatively connected to the second sense resistor, and at least one charging terminal operatively connected to the second battery terminal. At least portions of the charging circuit can be housed within the docking station and operatively connected to the computing circuitry, the first battery, and the power node via the first, second, third, and fourth docking connector portions. The computing circuitry can be constructed and adapted to provide a first portion of available current from the power supply to a first battery and a second portion of the available current from the power supply to a second battery, the relative value of the first portion and the second portion changing as the available current is drawn. The computing circuitry can be constructed and adapted to charge the batteries with a constant current mode followed by a constant voltage mode, and the computing circuitry can be constructed and adapted to change the relative values of the first and second portions in response to a change for the charging of the first battery from the constant current to constant voltage mode. The computing circuitry can be constructed and adapted to provide a first portion of available current from the power supply to the computing circuitry, a second portion of the available current from the power supply to a first battery, and a third portion of the available current from the power supply to a second battery, the relative values of the first portion, the second portion, and the third portions changing as the available current is drawn.

In another general aspect, a portable computer charging system, includes means for charging a first battery based on an amount of current flowing into computer circuitry, and means for charging a second battery based on an amount of current flowing into the first battery and into the computer circuitry.

The means for charging a second battery can be responsive to the means for charging a first battery. The first battery can form part of a portable computer means, and the second battery can form a part of a portable docking means. The means for charging a first battery can include first means for connecting to a power supply connector means and the means for charging a second battery can include second means for connecting to the power supply connector means. The first and second batteries can be housed in a housing of a portable computer. The means for charging a second battery can be operative to keep a sum of the current flowing to the computer circuitry, a current flowing to the first battery, and a current flowing to the second battery from exceeding a maximum current value for the power source. The means for charging a second battery can be operative to maximize a sum of the current flowing to the computer circuitry, a current flowing to the first battery, and a current flowing to the second battery without exceeding a maximum current value for the power source.

In another general aspect, the invention features a method of supplying power to a portable computer system. The method includes steps of determining an amount of current flowing from a power source to computer circuitry, charging a first battery with additional current, an amount of the additional current depending on the amount of current determined in the step of determining, and charging a second battery with further current, the amount of further current depending on the amount of current flowing from the power source and the amount of additional current.

The step of charging a first battery can charge a battery in a portable computer and the step of charging a second battery can charge a battery in a docking station. The method can further include the step of disconnecting a power supply from a connector in the docking station and connecting it to a connector in the portable computer. The step of charging a second battery can be operative to keep the sum of the current flowing to the computer circuitry, the additional current, and the further current below a maximum current value for the power source. The step of charging a second battery can be operative to maximize the sum of the current flowing to the computer circuitry, the additional current, and the further current while keeping the sum below a maximum current value for the power source. The step of charging the first battery can take place in a portable computer unit, the step of charging the second battery can take place in a docking unit, and the steps of charging the first and second batteries can be responsive to a step of operatively electrically connecting the power supply, the docking station, and the main computer unit together.

Systems according to the invention may be advantageous in that they can automatically charge a portable computer system and its docking station in a versatile, efficient, and cost-effective manner. The automatic sequencing of charging between the batteries in the system and the ability to easily power either the docking station or the main computer unit can provide users with a great deal of flexibility and autonomy in using the system with or without its docking station. And this can be done without requiring the user to swap batteries or swap cords or otherwise concern himself or herself with the allocation of charging.

Systems according to the invention can also take maximum advantage of the current available from an adapter of a given size and weight to provide the highest autonomy from the infrequent and limited charges that are often available during traveling. This can allow a lighter and less expensive charger to service a computer with less impact on performance than might otherwise occur. And because systems according to the invention can obtain this functionality from a relatively simple circuit, the overall cost and weight of the computer, docking station, and charging circuitry can be further reduced.

DETAILED DESCRIPTION OF AN
ILLUSTRATIVE EMBODIMENT

Figure 1:
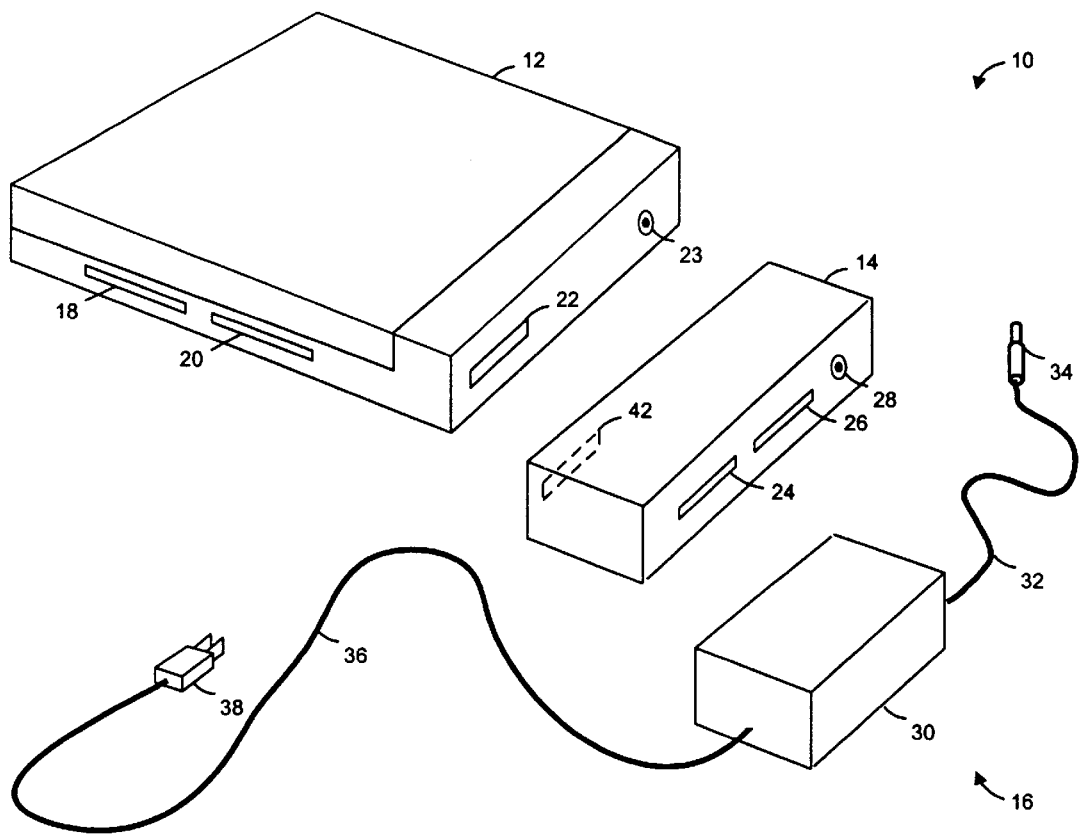
FIG. 1 is a simplified perspective drawing of a portable computer system according to the invention.
Figure 2:
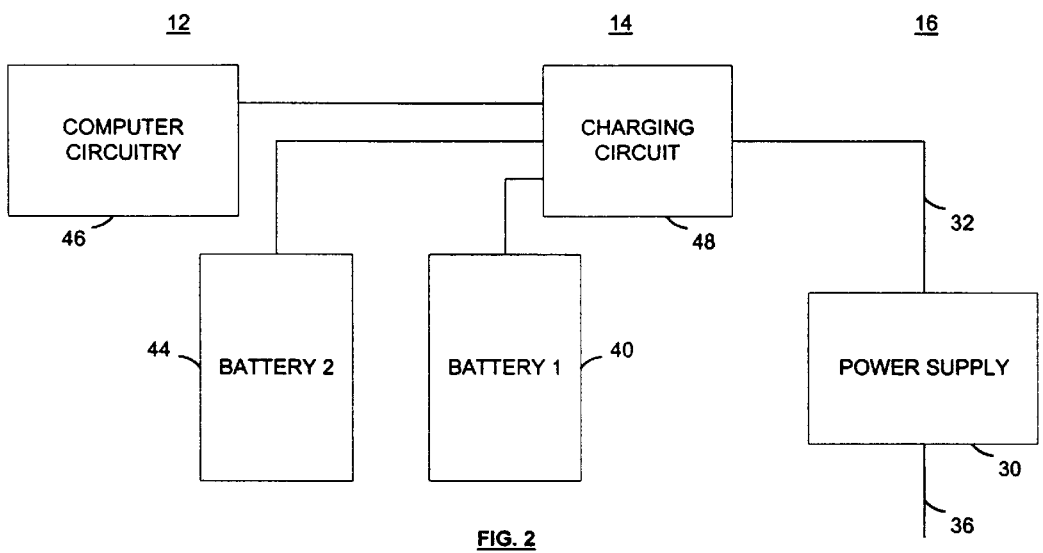
FIG. 2 is a block diagram of a charging system for the computer system of FIG. 1.

Referring to FIGS. 1 and 2, a portable computer system 10 according to the invention includes a main computer unit 12, a docking station 14, and a charging adapter 16. The main computer unit is a self-sufficient, battery-powered computer with computer circuitry 46 that can include a processor, memory, and user interface hardware, such as a keyboard, touch pad, and display screen. The main computer unit's housing can be in the form of a clam-shell case with the keyboard and display being mounted in opposing hingedly attached portions. A docking connector 22 is also located on the main computer unit, and mates with a corresponding docking connector 42 on the docking station to provide additional functionality to the computer. The docking connector can include power supply contacts that convey power from the docking station to the main computer unit and computer circuit contacts that connect signals, such as bus signals and peripheral interface signals, from the computing circuitry to the docking station.

The main computer unit 12 can define one or more peripheral interface slots 18, 20. Each of these includes a connector that allows a peripheral device, such as a floppy disk drive, network interface, or modem, to be inserted and carried with the computer. They can each be rectangular parallelepiped cavities in the housing, with their connectors being located on an opposite face from an opening in the housing formed by the cavity, such that drives or other peripheral devices can slide into the slot and mate with the connector in a single stroke. Further included at the periphery of the main computer unit housing is a power adapter connector 23 that can mate with a supply connector 34 connected to a supply cord 32 of the charging adapter 16. The charging adapter's supply cord is also connected to a power supply 30, which is in turn connected to a mains cord 36 and a mains connector 38, which can interface with a mains power source, such as a household outlet or a vehicle outlet.

The docking station 14 can also include one or more additional peripheral interfaces, such as peripheral interface slots 24, 26, which can follow similar form factors and electrical specifications to those in the main computer unit, allowing drives and peripheral devices to be swapped between the slots in the main unit and the slots in the docking station. Other types of peripheral interfaces, such as parallel, serial, and input device ports can also be located on the docking station housing. Further included at the periphery of the docking station housing is a power adapter connector 28 that can also mate with the supply connector 34.

The charging system for the portable computer system 10 can include a charging circuit 48 that has an input responsive to the power supply. The charging circuit has a first output operatively connected to a terminal of a first battery 40, a second output operatively connected to a terminal of a second battery 44, and a third output operatively connected to a power rail for computer circuitry 46 within the main computer unit 12. Although in one instance the charging circuitry is divided between the docking station 14 and the main computer unit 12, the distribution of the charging circuitry among the parts of the system 12, 14, 16 can vary somewhat, with the configuration of the connectors between the different parts of the computer system being adapted accordingly.

Figure 3:
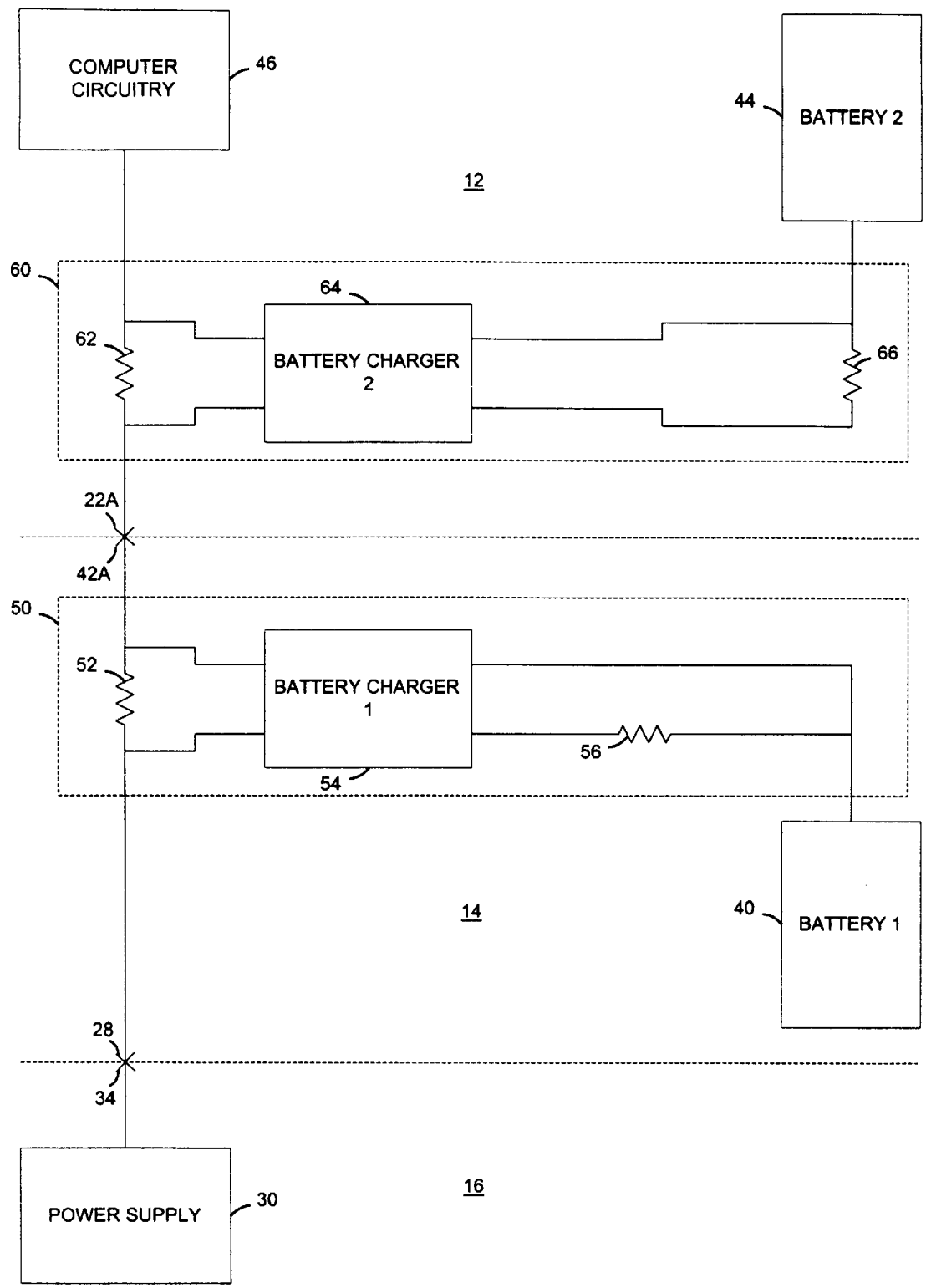
FIG. 3 is a circuit diagram of a charging system for use in the system of FIG. 1.
Figure 4:
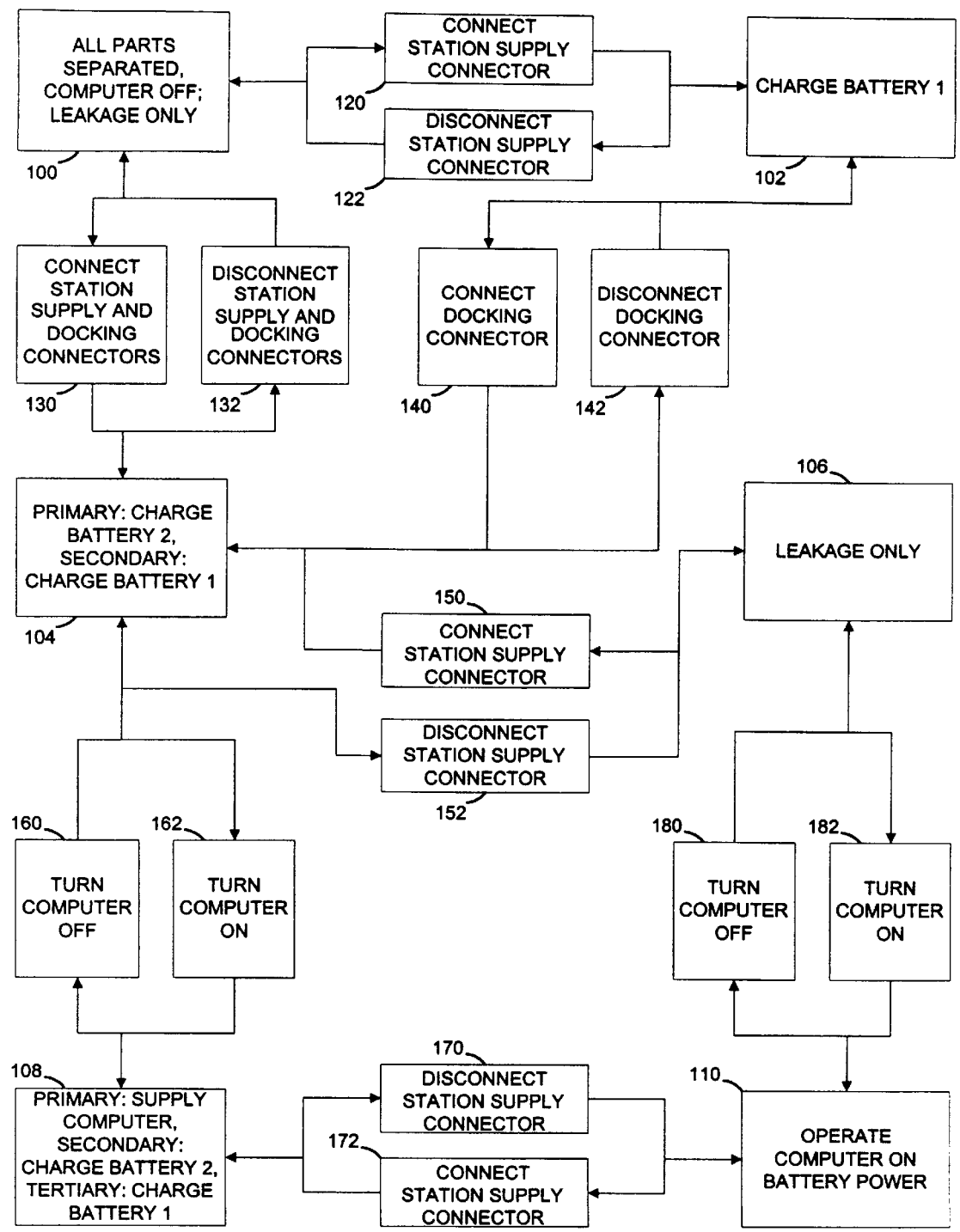
FIG. 4 is a state diagram illustrating notable operating modes of the computer system of FIG. 1 using the charging system of FIG. 3.

Referring also to FIG. 3, in one particular embodiment, the charging circuit 48 can include a first charging portion 50 and a second charging portion 60. The first charging portion is connected between the power adapter connector 28, the terminal of the first battery 40, and a first power supply contact 42A. This power supply contact can form part of the docking connector 42 of the docking station 14. It can also be part of a connector adapted to mate with the power adapter connector 23 in the main computer unit.

The second battery charging portion 60 can be operatively connected between the terminal of the second battery 44, the power rail for the computer circuitry 46, and a power supply contact 22A of the docking connector 22 of the main computer unit 22 that is adapted to mate with the first power supply contact 42A of the docking connector 42 of the docking station.

The first battery charging portion 50 includes a supply current sense resistor 52 having a first terminal operatively connected to its input and a second terminal operatively connected to the first power supply rail of the computer circuitry 46. The first battery charging portion also includes a first battery charger 54 that has first and second supply terminals operatively connected to the first and second terminals of the first supply current sense resistor. The first battery charger further includes a first charge terminal operatively connected to the terminal of the first battery 40 and a second charge terminal operatively connected to a first terminal of a first charge current sense resistor 56. The first charge current sense resistor also has a second terminal operatively connected to the battery terminal.

The second battery charging portion 60 includes a supply current sense resistor 62 having a first terminal operatively connected to its input and a second terminal operatively connected to the first power supply contact 42A of the docking station. The second battery charging portion also includes a second battery charger 64 that has first and second supply terminals operatively connected to the first and second terminals of the second supply current sense resistor. The second battery charger further includes a first charge terminal operatively connected to the terminal of the second battery 44 and a second charge terminal operatively connected to a first terminal of a first charge current sense resistor 66. The first charge current sense resistor also has a second terminal operatively connected to the battery terminal.

Operation of the computer system 10 including the charging circuitry shown in FIG. 3 will now be discussed in connection with FIGS. 1–4. In a stowage state 100, the main computer unit 12, the docking station 14, and the charging adapter 16 are all disconnected. Neither battery is charged in this state, and no power is being consumed, except perhaps a small leakage current. If the user connects the supply connector 34 of the powered-up supply 30 to the docking connector 28 (step 120), the computer system will exit this state and enter a base charging state 102 in which the charging adapter charges the first battery 40, if necessary, until it is fully charged. If the supply connector is disconnected while the system is in the base charging state, (step 122) the system will return to the stowage state. Note that disconnecting the mains connector 38 will also cause the system to go from the base charging state to a state that is essentially equivalent to the stowage state.

If the user connects both the supply connector 34 to the power adapter connector 28 in the docking station 14 and the docking connector 42 in the docking station to the docking connector 22 in the main computer unit 12 (step 130), the system will enter a principal charging state 104. In this state, current from the charging adapter 16 will be primarily used to charge the second battery 44 in the main computer unit. Any remaining current will be used to charge the first battery 40 in the docking station 14. This coordinated charging of the two batteries can take place because the charging current supplied by the first battery charger 54 to the first battery is limited by the amount of current that the first battery charger detects flowing through the first supply current sense resistor 52. If the second battery charging portion 60 is drawing a large amount of current to charge the second battery 44, the first battery charging portion 50 will provide little or no current to the first battery.

Depending on the capacity of the power supply 32 and the charge level of the first battery, charging of the second battery 44 may altogether preempt the charging of the first battery 40, partially preempt the charging of the first battery, or have no impact on the charging of the first battery. Charging of the first battery may begin when the second battery is almost fully charged (e.g., at a transition from constant connect charging to constant voltage charging). Charging of the first battery may also take place at the same time as charging of the second battery, while the computer is off in a system with a power supply with sufficient capacity to charge both batteries. From the principal charging state 104, disconnecting the docking connector (step 142) will take the system to the base charging state (state 102), and reconnecting the docking connector (step 140) will return the system to the principal charging state.

Disconnecting the supply connector (step 152) will take the system 10 from the principal charging state 104 to an ambulant docked state 106. In this state, the main computer unit 12 and the docking station 14 are docked, but the computer is off, so no power is consumed except possibly a small amount due to leakage current. Reconnecting the supply connector (step 150) will return the system to the principal charging state.

Turning the computer on (step 160) will take the system 10 from the principal charging state 104 to the powered use state 108. In this state, current from the power supply 32 is primarily supplied to the computer circuitry 46, current is secondarily used to charge the second battery 44 in the main computer unit 12, and remaining current is used to charge the second battery 40 in the docking station 14.

Operation in the powered use state 108 can be achieved by the interaction between the first battery charging portion 50 and the second battery charging portion 60. The second battery charging portion detects how much current is being used by the computer circuitry 46 by monitoring the current through the second supply sense resistor 62, and uses part or all of the remaining available current within the capabilities of the charging adapter 16 to charge the second battery. Depending on the capabilities of the power supply 32, the computer circuitry 46 may, at least in some operating modes, preempt all charging of the second battery. It is also possible to provide a power supply that can provide sufficient current to power the computer circuitry 46 and charge the second battery 44 in the main computer unit 12 either at a full or partial rate regardless of the drain of the computer circuitry.

While the computer circuitry 46 is drawing current, and the second battery 44 is being charged, the power supply 32 may or may not have enough remaining capacity to charge the first battery. The first battery charging portion 50 determines this by monitoring the current through the first supply sensing resistor 52. Depending on the capacity of the power supply 32, it is possible that the computer circuitry 46 will receive current for its operation, at the same time that both batteries are being charged, although the first battery 40 may or may not be charged at its highest rate of charging.

This operating state is highly versatile. The computer circuitry is being supplied with enough power for it to operate, and any remaining power is allocated to one or both of the batteries, with the second battery being preferred. As the second battery charges up, more and more current can be provided to the first battery. The maximum amount of current is therefore allocated to all recipients on a priority basis until there is no more need for it. For example, if the computer circuitry is in an idle state and drawing less power, the batteries will receive more current. As the second battery begins to be fully charged, the first battery will receive more and more current. In this way, the capacity of the power supply is fully utilized, and the user will obtain the most benefits from it over any given period of time.

Note that the priority scheme need not be absolute. For example, it may be possible to adjust the sense resistors or to provide a supplemental resistor network such that the first battery charger is never fully preempted by the second battery charger, allowing for a small trickle charge whenever the power supply is connected. It may also be desirable to allocate some current to the second battery at the expense of power provided to the computer by placing the computer in a low power mode (e.g., by reducing clock rate) when one or both of the batteries is completely discharged. It may also be possible to provide a compound power adapter connector and one or more additional resistors, such that power supplies of different current capacities can be fully taken advantage of in a transparent manner.

Disconnecting the supply connector 34 from the power adapter connector 28 in the docking station 14 (step 170) will take the system from the powered use state 108 to an ambulant docked use state 110. In this state, the second battery 44 will supply power to the computer. It may also be possible to cause current to be primarily supplied from the first battery 40 in the docking station 14 and secondarily supply the computer circuitry from the second battery 44. This hierarchy will allow the main computer unit 12 to be disconnected from the docking station and still retain the maximum amount of charge for the most autonomy of the main unit. Reconnecting the supply connector (step 172) will return the system from the ambulant docked use state to the powered use state.

Turning the computer off in the ambulant docked use state (step 182) will take the computer system to the ambulant docked state 106, and turning it on again (step 180) will return it to the ambulant docked use state. Connecting the supply connector 34 to the power adapter connector 23 in the main computer unit will allow the computer circuitry 46 and the second battery 44 to receive current from the charging adapter 16. In this state, the adapter primarily supplies power to the computer circuitry and secondarily supplies power to the second battery.

Figure 5:
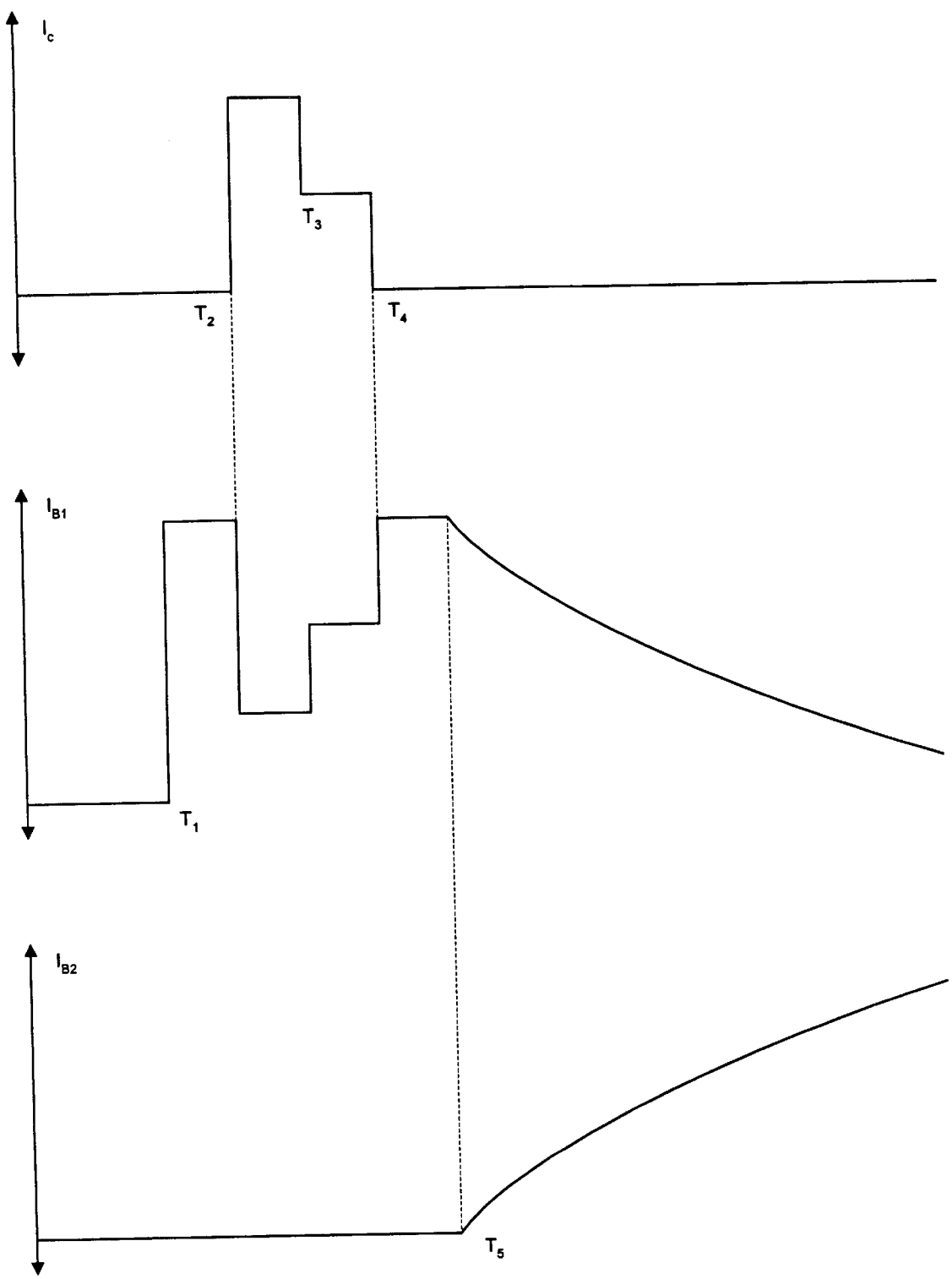
FIG. 5 is a waveform diagram illustrating the operation of the charging system of FIG. 1 for a power adapter having a capacity that is about 50% higher than required to power its computer circuitry.

Operation of the computer system 10 will now be discussed in connection with the wave forms shown in FIG. 5, which illustrate the charging of the system with a power adapter having a capacity that is about 50% higher than required to power the computer circuitry 46. With the computer off and the computer docked to its docking station, the computer system is in its ambulant docked state 106. When the user connects the docking station supply connector (step 150) to the power adapter connector 28 (time $T_1$), the system enters its principal charging state 104 in which the adapter primarily charges the second battery 44. Since the second battery 44 is relatively depleted, no current is left over to be supplied to the first battery ($I_{B1}=0$). The system remains in this state until the user turns the computer on (step 163, time $T_2$), causing the system to enter the powered use state 108. In this state, the power supply circuitry 30 supplies a current $I_c$ to the computer circuitry 46. This amount of current is diverted from the current $I_{B2}$ used to charge the second battery, causing it to charge more slowly.

While the computer is in use, its current requirements can change (time $T_3$). When this happens, the change in current to the computer circuitry is reflected in the change in the current $I_{B2}$ supplied to the second battery 44. The change in power required by the computer circuitry can be due to a change in usage of the computer (e.g., entering an idle state). In some embodiments, a change in temperature within the computer can cause the computer circuitry 46 or the first and second batteries 40, 44 to draw less current if an over temperature condition is detected. This operation is described in more detail in commonly assigned co-pending application Ser. No. 09/107,648 entitled A METHOD AND APPARATUS REDUCING HEAT GENERATION IN A PORTABLE COMPUTER, filed on the same day as this application and herein incorporated by reference.

When the user turns the computer off again (step 160, time $T_4$), the computer reenters the principal charging state 104. In this state, the second battery can resume charging at its full rate. Once the battery is significantly charged, it ceases to be charged in a constant voltage current mode, and begins to be charged in a constant voltage mode (time $T_5$). When this occurs, the current to the second battery $I_{b2}$ begins to drop asymptotically. The first charging portion 50 detects this drop and begins to allocate some current to the first battery 40. In this way, both batteries will be charged and the system will take maximum advantage of the current available from the power supply 30.

The present invention has now been described in connection with a number of specific embodiments thereof. However, numerous modifications which are contemplated as falling within the scope of the present invention should now be apparent to those skilled in the art. Therefore, it is intended that the scope of the present invention be limited only by the scope of the claims appended hereto. In addition, the order of presentation of the claims should not be construed to limit the scope of any particular term in the claims.

What is claimed is:

1. A portable computer, comprising:
   a portable computer unit, comprising:
      computing circuitry having a power node,
      a first battery having a terminal,
      a first docking connector portion including computing circuitry interface contacts operatively connected to the computing circuitry,
      a second docking connector portion including power supply contacts including at least one contact operatively connected to the power node of the computing circuitry and at least one contact operatively connected to the terminal of the first battery,
   a docking station, comprising:
      a second battery having a terminal,
      a third docking connector portion including computing circuitry interface contacts constructed and adapted to mate with the interface contacts of the first docking connector portion,
      a fourth docking connector portion including power supply interface contacts constructed and adapted to mate with the power supply contacts of the second docking connector portion,
      a charging circuit having a first output operatively connected to the first battery terminal, a second output operatively connected to the second battery terminal, and a third output operatively connected to the power node of the portable computer unit, and a power supply input connector constructed and adapted to mate with a connector of a power supply.

2. The portable computer of claim 1 wherein the first docking connector portion is constructed and adapted to mate with the connector of the power supply, and wherein a portion of the charging circuit is located within the portable computer unit and is responsive to the power supply.

3. The portable computer of claim 1 further including an input connector portion constructed and adapted to mate with the connector of the power supply, and wherein a portion of the charging circuit is located within the portable computer unit and is responsive to the power supply.

4. The portable computer of claim 1 wherein the charging circuit includes a first battery charging portion operatively connected between the first output of the charging circuit, the third output of the charging circuit and a second battery charging portion that also has a first input operatively connected to the power supply node and a first output operatively connected to the second battery terminal.

5. The portable computer of claim 4 wherein the first charging portion includes a first sense resistor operatively connected between the third output of the charging circuit and a second node and further including a first battery charger having a pair of sense terminals operatively connected the first sense resistor, and at least one charging terminal operatively connected to the first battery terminal, and wherein the second charging portion includes a second sense resistor operatively connected between the second node and the input of the charging circuit and further including a second battery charger having a pair of sense terminals operatively connected the second sense resistor, and at least one charging terminal operatively connected to the second battery terminal.

6. The portable computer of claim 1 wherein at least portions of the charging circuit are housed within the docking station and operatively connected to the computing circuitry, the first battery, and the power node via the first, second, third, and fourth docking connector portions.

7. The portable computer of claim 1 wherein the computing circuitry is constructed and adapted to provide a first portion of available current from the power supply to a first battery and a second portion of the available current from the power supply to a second battery, the relative value of the first portion and the second portion changing as the available current is drawn.

8. The portable computer of claim 7 wherein the computing circuitry is constructed and adapted to charge the batteries with a constant current mode followed by a constant voltage mode, and wherein the computing circuitry is constructed and adapted to change the relative values of the first and second portions in response to a change for the charging of the first battery from the constant current to constant voltage mode.

9. The portable computer of claim 1 wherein the computing circuitry is constructed and adapted to provide a first portion of available current from the power supply to the computing circuitry, a second portion of the available current from the power supply to a first battery, and a third portion of the available current from the power supply to a second battery, the relative values of the first portion, the second portion, and the third portions changing as the available current is drawn.

10. The portable computer of claim 9 wherein the computing circuitry is constructed and adapted to charge the batteries with a constant current mode followed by a constant voltage mode, and wherein the computing circuitry is constructed and adapted to change the relative values of the first, second, and third portions in response to a change for the charging of the first battery from the constant current to constant voltage mode.

11. A portable computer charging system, comprising:
means for charging a first battery based on an amount of current flowing into computer circuitry, and
means for charging a second battery based on an amount of current flowing into the first battery and into the computer circuitry.

12. The portable computer charging system of claim 11 wherein the means for charging a second battery is responsive to the means for charging a first battery.

13. The portable computer charging circuit of claim 11 wherein the first battery forms part of a portable computer means, and wherein the second battery forms a part of a portable docking means.

14. The portable computer charging circuit of claim 13 wherein the means for charging a first battery includes first means for connecting to a power supply connector means and wherein the means for charging a second battery includes second means for connecting to the power supply connector means.

15. The portable computer of claim 11 wherein the first and second batteries are housed in a housing of a portable computer.

16. The portable computer of claim 11 wherein the means for charging a second battery is operative to keep a sum of the current flowing to the computer circuitry, a current flowing to the first battery, and a current flowing to the second battery from exceeding a maximum current value for the power source.

17. The portable computer of claim 16 wherein the means for charging a second battery is operative to maximize a sum of the current flowing to the computer circuitry, a current flowing to the first battery, and a current flowing to the second battery without exceeding a maximum current value for the power source.

18. A method of supplying power to a portable computer system, comprising:
determining an amount of current flowing from a power source to computer circuitry,
charging a first battery with additional current, an amount of the additional current depending on the amount of current determined in the step of determining, and
charging a second battery with further current, the amount of further current depending on the amount of current flowing from the power source and the amount of additional current.

19. The method of claim 18 wherein the step of charging a first battery charges a battery in a portable computer and wherein the step of charging a second battery charges a battery in a docking station.

20. The method of claim 19 further including the step of disconnecting a power supply from a connector in the docking station and connecting it to a connector in the portable computer.

21. The method of claim 18 wherein the step of charging a second battery is operative to keep the sum of the current flowing to the computer circuitry, the additional current, and the further current below a maximum current value for the power source.

22. The method of claim 21 wherein the step of charging a second battery is operative to maximize the sum of the current flowing to the computer circuitry, the additional current, and the further current while keeping the sum below a maximum current value for the power source.

23. The method of claim 18 further wherein the step of charging the first battery takes place in a portable computer unit, wherein the step of charging the second battery takes place in a docking unit, and wherein the steps of charging the first and second batteries are responsive to a step of operatively electrically connecting the power supply, the docking station, and the main computer unit together.

* * * * *